July 2, 1946. A. E. KILPELA 2,403,378
TRANSMISSION
Filed March 4, 1943
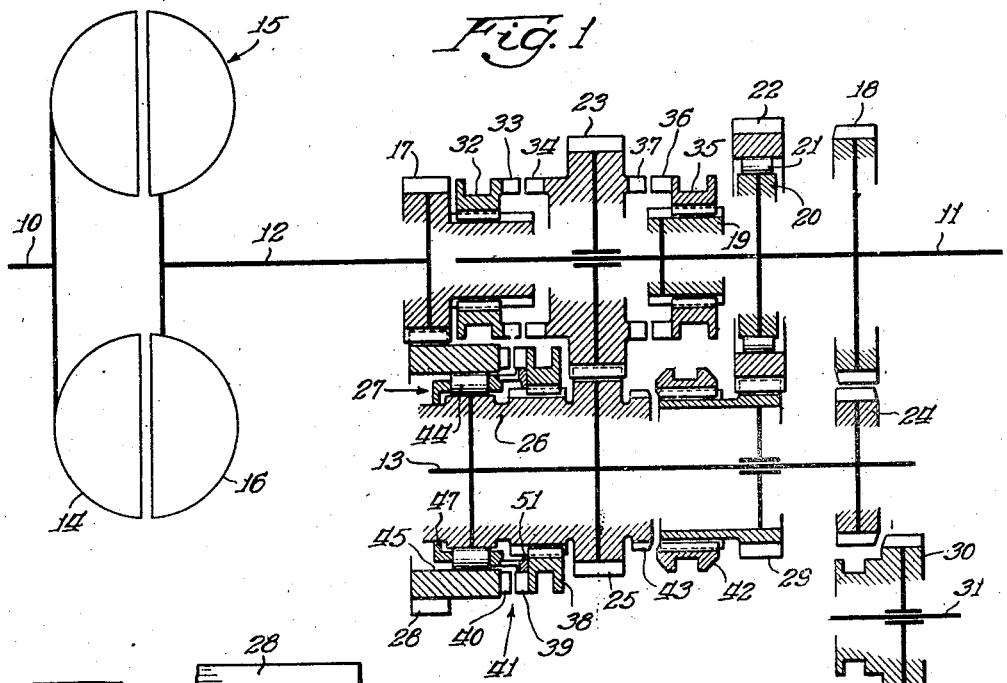
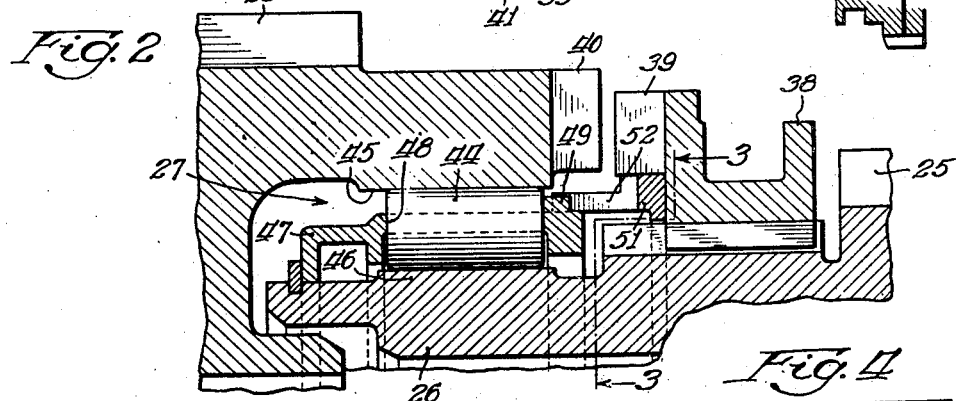
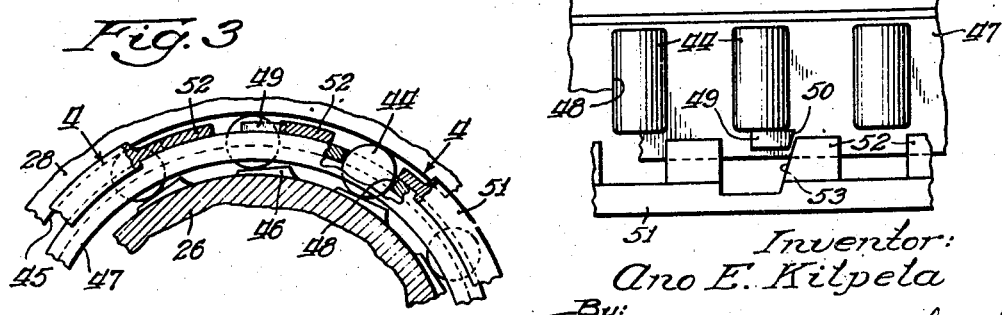
Inventor:
Ano E. Kilpela
By: Edward C. Gilgough
Atty Patented July 2, 1946

2,403,378

UNITED STATES PATENT OFFICE 2,403,378

TRANSMISSION

Ano E. Kilpela, Detroit, Mich., assignor to Borg-Warner Corporation, Chicago, Ill., a corporation of Illinois Application March 4, 1943, Serial No. 477,953

2 Claims. (Cl. 192—48)

My invention relates to transmissions, such as for automotive vehicles, and more particularly my invention relates to clutch mechanism suitable for use in transmissions.

Transmissions have been commonly provided with one-way clutch mechanism for completing a power train between the driving and driven shafts and with means for driving the driven shaft at a higher speed ratio than that at which the shaft is driven by means of the one-way clutch mechanism whereby the one-way clutch mechanism overruns. Such transmissions are also commonly provided with positive clutch means for locking up the one-way clutch mechanism whereby the driven shaft may be driven at the low speed ratio with a positive drive. The one-way clutch mechanism commonly comprises a plurality of rollers adapted to wedge between opposite cammed surfaces. It has been found with such transmissions that when the positive clutch is in engaged condition for locking up the one-way clutch for positive low speed drive, the rollers of the one-way clutch wedge tightly between the opposite cammed surfaces, and the one-way clutch holds the engaging parts of the positive clutch forcibly together such that it is in general quite difficult to disengage the positive clutch for a renewed drive through the one-way clutch, and often a breakage of parts of the transmission accompanies attempts to disengage the positive clutch due to this action of the one-way clutch. This tight engagement of the rollers between the opposite cammed surfaces and the forcible holding of the engaging parts of the positive clutch together when the positive clutch is in engaged condition and the driven shaft is being driven is due to small relative movement of the opposite cammed surfaces and the parts of the positive clutch which the positive clutch allows. A positive clutch in general does allow at least small relative movement between its members due to wear of the clutch and to the practical impossibility of manufacturing a positive clutch with no clearances between its parts.

It is an object of my invention to provide for use with such a transmission, having a one-way clutch and a positive clutch for use instead of the one-way clutch, means for preventing such tight locking up of the one-way clutch and forcible engagement of parts of the positive clutch when the positive clutch is engaged.

It is another object of my invention to provide for use with a transmission of this type having a one-way clutch of the roller type in a power train thereof, means actuated by the positive clutch for moving the rollers out of position for wedging between the opposite cammed surfaces of the one-way clutch when the positive clutch is brought into engagement.

It is still another object of my invention to provide, for use with such a transmission, a carrier for the rollers of the one-way clutch and cam means on the carrier and on the positive clutch cooperating to move the carrier and thereby to move the rollers out of wedging position when the positive clutch is brought into engagement.

The invention consists of the novel constructions, arrangements and devices to be hereinafter described and claimed for carrying out the above stated objects and such other objects as will appear from the following description of a certain preferred embodiment illustrated in the accompanying drawing, wherein:

Fig. 1 is a view showing diagrammatically a transmission having a one-way clutch in a power train thereof and a positive clutch for locking up the one-way clutch;

Fig. 2 is a fragmentary sectional view of the one-way clutch and the positive clutch for locking up the one-way clutch in the transmission illustrated in Fig. 1;

Fig. 3 is a sectional view taken on line 3—3 of Fig. 2; and

Fig. 4 is a developed view of the one-way clutch taken substantially on curved line 4—4 of Fig. 3.

Like characters of reference designate like parts in the several views.

The transmission illustrated in Fig. 1, which is suitable for installation in an automotive vehicle, comprises a driving shaft 10, a driven shaft 11, an intermediate shaft 12 and a countershaft 13. The driving shaft 10 is connected with and is adapted to drive a driving element 14 of a fluid coupling 15. The intermediate shaft 12 is connected with and is adapted to be driven by the driven element 16 of the fluid coupling 15. The fluid coupling 15 is of the well-known type wherein the driving element 14 rotates and causes a fluid to flow, and the moving fluid causes the driven element 16 to rotate in the same direction as the driving element 14 and with a cushioned or yielding drive.

The shaft 12 has fixed thereon a gear 17, as may be seen in the drawing. The shaft 11 has fixed thereon a gear 18, a hub member 19, and a hub member 20 which latter hub member carries, by means of a one-way roller clutch 21, a gear 22; and the shaft has rotatably mounted thereon a gear 23. The shaft 13 has fixed thereon gears 24 and 25 and a hub portion 26 which carries, by means of a one-way roller clutch 27, a gear 28; and the shaft has rotatably mounted thereon a gear 29. As may be seen in the drawing, the gears 17 and 28 are in mesh, the gears 23 and 25 are in mesh, and the gears 22 and 29 are in mesh. A driving connection through the gears 24 and 18 may be established by means of an idler gear 30 which is slidably and rotatably mounted on a shaft 31. The gear 30 is adapted to mesh with both of the gears 24 and 18 and may be moved into such meshing relation by any suitable means (not shown).

The gear 17 has splined thereto a clutch member 32 having teeth 33. The gear 23 is provided with teeth 34 which are adapted to interengage with the teeth 33 when the member 32 is moved toward the gear 23 for positively clutching the gears 17 and 23 together. The hub member 19 has splined thereon a clutch member 35 having teeth 36. The gear 23 is provided with teeth 37 which are adapted to interengage with the teeth 36 when the member 35 is moved toward the gear 23 for clutching positively together the gear 23 and the shaft 11.

The gear 25 has slidably splined thereon a clutch member 38 having teeth 39. The gear 28 is provided with teeth 40 which are adapted to interengage with the teeth 39 when the member 38 is moved toward the gear 28. The slidable clutch member 38, the teeth 39, and the teeth 40 form a positive type clutch which may be designated as 41 for positively connecting together the shaft 13 and the gear 28. It will be appreciated that the clutch 41 in effect shunts the one-way clutch 27, and the clutch 41 operates to lock up the one-way clutch such that after engagement of the clutch 41 there can be no longer a freewheeling drive between the gear 28 and the hub member 26. The gear 29 is provided with a clutching member 42 which is slidably splined on the gear 29. Teeth 43 are provided on the gear 25, and these teeth are adapted to interengage with the internal splines of the clutch member 42 when the member 42 is moved toward the gear 25 for positively clutching together the gear 29 with the gear 25 and the shaft 13. The clutch members 32, 35, 38 and 42 may be actuated to engage or disengage the respective positive clutching means by any suitable means which are not shown.

The illustrated transmission provides four speeds forward and a speed in reverse. First or low speed forward may be obtained by moving the clutch member 42 into clutching engagement with the teeth 43, and the drive is then from the shaft 10 through the fluid coupling 15, the shaft 12, the gear 17, the gear 28, the one-way clutch 27, the hub portion 26, the shaft 13, the body of the gear 25, the teeth 43, the clutch member 42, the gear 29, the gear 22, the one-way clutch 21 and the hub member 20 to the shaft 11. It will be apparent that the one-way clutches 27 and 21 are so constructed to provide such a drive between the shafts 10 and 11 and that these clutches permit the shaft 11 to free-wheel or to rotate at a speed faster than that at which it is driven by means of the gearing when the vehicle on which the transmission is installed is coasting, for example. Second speed forward may be obtained by moving the clutch member 35 to engage the teeth 36 and 37 whereby the drive is from the shaft 12 through the gear 17, the gear 28, the one-way clutch 27, the hub portion 26, the shaft 13, the gear 25, the gear 23, the teeth 36 and 37, the clutch member 35, and the hub member 19 to the shaft 11. At this speed the clutch member 42 may be permitted to remain engaged with the teeth 43, and the one-way clutch 21 overruns. Third speed forward may be obtained by moving the member 32 to engage the teeth 33 and 34 after first having disengaged teeth 36 and 37. The drive is then from the shaft 12 through the body of the gear 17, the clutch member 32, the teeth 33 and 34, the gear 23, the gear 25, the teeth 43, the clutch member 42, the gear 29, the gear 22, the one-way clutch 21, and the hub member 20 to the shaft 11. In this case, the one-way clutch 27 overruns. Fourth speed through the transmission may be obtained by having engaged the teeth 33 and 34 and the teeth 36 and 37. The drive is then from the shaft 12 through the body of the gear 17, the clutch member 32, the teeth 33 and 34, the body of the gear 23, the teeth 36 and 37, the clutch member 35, and the hub member 19 to the shaft 11. In this case, the one-way clutch 27 overruns, and with the clutch member 42 still engaged with the teeth 43, the one-way clutch 21 overruns. It has been found that this transmission may be very advantageously operated by using second speed as a low speed and fourth speed as a high speed. A shift from second speed to fourth speed is made simply by engaging teeth 33 and 34, with the teeth 36 and 37 already in engagement. Reverse may be obtained through the transmission with the teeth 33 and 34 disengaged, the teeth 36 and 37 disengaged, the clutch member 42 disengaged from the teeth 43, and with the idler gear 30 moved into mesh with the gears 24 and 18. The drive in this case will be from the shaft 12 through the gear 17, the gear 28, the one-way clutch 27, the hub portion 26, the shaft 13, the gear 24, the gear 30, and the gear 18 to the shaft 11.

A drive in second speed which is positive and allows no freewheeling of the shaft 11 with respect to the shaft 12 may be obtained by engaging the clutch 41 to lock up the one-way clutch 27. The clutch 41 in effect shunts across and renders ineffective the clutch 27 whereby the hub portion 26 cannot thereafter freewheel with respect to the gear 28. In actual practice, with such a use of a positive type clutch, difficulties have been experienced with the one-way roller clutch locking up tightly between the opposite engaging surfaces of the clutch and forcing the sides of the teeth of the shunting positive clutch tightly together, due to small relative movement of the parts of the positive clutch, as has been hereinbefore explained, whereby it was only with difficulty—and many times not without breakage of parts of the transmission—that the positive clutch could be disengaged to allow the drive again to be through the one-way clutch. Such difficulty was encountered in connection with the illustrated transmission when it was desired to shift from a positive drive in second speed to fourth speed, for example. To obviate these difficulties, I have provided an improved clutch mechanism which will be hereinafter described particularly with respect to Figs. 2, 3 and 4 of the drawing.

Referring now in particular to these figures of the drawing, the one-way clutch 27 comprises a plurality of rollers 44 which are disposed between an inner cylindrical surface 45 which is provided in the body of the gear 28 and a plurality of slanting cam portions 46 which are provided on the hub portion 26 as shown. There is one cam portion 46 provided for each of the rollers 44, and the construction is such that when the gear 28 is rotated in a clockwise direction as seen in Fig. 3, the rollers 44 may wedge between the respective cam portions 46 and the cylindrical surface 45 whereby the hub portion 26 is rotated with the gear 28 and the clutch 27 is effective. When the gear 28 is rotated in the opposite direction, each of the rollers 44 may move counterclockwise with respect to the hub portion 26 out of their positions for wedging between the cam portions and surface 45, and the clutch 27 is then ineffective and the hub member 26 may rotate free of the gear 28.

A carrier member 47 which is rotatably mounted with respect to the hub portion 26 is provided for the rollers 44. The carrier member 47 is formed with a plurality of openings 48 therein, one for each of the rollers 44, in which openings the rollers 44 are positioned. The carrier operates to position each of the rollers 44 with respect to the other rollers whereby all of the rollers move together.

A plurality of projections 49 having slanted sides 50 are formed on the carrier 47, and the clutch member 38 carries a member 51 on which is formed a plurality of tooth-like projections 52. Certain of the latter projections, which correspond with the projections 49 in number and approximately in spacing about the clutch member 38, are provided with sides 53 slanted similarly to the sides 50 of the projections 49. The member 51 is carried by and moves with the clutch member 38, and when the member 38 is moved toward gear 28 to bring teeth 39 and 40 into engagement, the projections 52 move over the carrier 47 between the rollers 44, and the slanted sides 53 make contact with the similarly slanted sides 50 of the projections 49. On the member 38 being moved further to fully engage teeth 39 and 40 the sides 53 of the projections 52 act on the sides 50 of the projections 49 and rotate the carrier 47 on the hub portion 26 and thereby the rollers 44, to move the rollers out of their positions whereby they may wedge between the surface 45 and the cam portions 46 and into positions between the cam portions 46. It will thus be apparent that the slanted side portions 50 and 53 act as cam means for moving the rollers 44 out of their positions for wedging between the cam portions and surface 45, and the cam means thereby functions to maintain the one-way clutch 27 disengaged and inoperative when the positive clutch 41 is engaged.

It will be apparent, since the cam means including the slanted side portions 53 and 50 functions to rotate the rollers 44 out of their positions for wedging between the cam portions 46 and surface 45, that the small relative movements between the body of the gear 28 and the hub portion 26 will have no effect to tighten the rollers between the cam portions 46 and surface 45 and cause the teeth 39 and 40 to be forcibly held together. There will thus be no difficulty in disengaging the teeth 39 and 40 of the clutch 41 when it is again desired to drive through the one-way clutch 27, as when it is desired to shift from a positive drive in second speed to a drive in fourth speed.

It will be apparent to those skilled in the art that changes may be made in the constructions and arrangements shown and described. In particular, it will be apparent, although I have described my improved clutch mechanism in connection with an automotive transmission, that the clutch mechanism may be useful in any power train which comprises a one-way clutch and a positive type clutch for shunting the one-way clutch and for use instead of the one-way clutch. I wish it to be understood, therefore, that my invention is not to be limited to the specific constructions shown and described, except only so far as the claims may be so limited.

I claim:

1. In combination, a driving member, a driven member, a one-way clutch for connecting said members in driving relation, said clutch comprising a plurality of rollers and opposite surfaces between which the rollers are adapted to wedge for locking up the clutch, a carrier for said rollers and movable with the rollers, a positive type clutch for connecting said members in driving relation, said positive clutch comprising a pair of members having axially extending teeth one of which members is axially movable for interengaging the teeth of the positive clutch members, an axially extending cam on said carrier, and an axially extending cam on the movable member of said positive clutch and located radially inwardly of the teeth on said member, said cam on the movable member of said positive clutch being adapted to cooperate with the cam on said carrier whereby, when the movable toothed member is moved to engage the positive clutch, the carrier is moved and the rollers are moved out of position for wedging between said opposite surfaces, thereby rendering the one-way clutch inoperative.

2. In combination, a driving member, a driven member, a one-way clutch for connecting said members in driving relation, said clutch comprising a plurality of rollers and opposite surfaces between which the rollers are adapted to wedge for locking up the clutch, a carrier for said rollers and movable with the rollers, a positive type clutch for connecting said members in driving relation, said positive clutch comprising a pair of members having axially extending teeth one of which members is axially movable for interengaging the teeth of the positive clutch members, an axially extending cam on said carrier, and an axially extending cam on the movable member of said positive clutch and separate from the teeth on said movable member, said cam on the movable member of said positive clutch being adapted to cooperate with the cam on said carrier whereby, when the movable toothed member is moved to engage the positive clutch, the carrier is moved and the rollers are moved out of position for wedging between said opposite surfaces, thereby rendering the one-way clutch inoperative.

ANO E. KILPELA.